United States Patent
O'Brien

(10) Patent No.: US 9,722,402 B2
(45) Date of Patent: Aug. 1, 2017

(54) CABLE CARRIER GUIDE

(71) Applicant: Dynatect Manufacturing, Inc., New Berlin, WI (US)

(72) Inventor: Jay O'Brien, Valparaiso, IN (US)

(73) Assignee: Dynatect Manufacturing, Inc., New Berlin, WI (US)

( * ) Notice: Subject to any disclaimer, the term of this patent is extended or adjusted under 35 U.S.C. 154(b) by 125 days.

(21) Appl. No.: 14/242,539

(22) Filed: Apr. 1, 2014

(65) Prior Publication Data
US 2015/0280407 A1 Oct. 1, 2015

(51) Int. Cl.
*H02G 3/30* (2006.01)
*H02G 3/04* (2006.01)

(52) U.S. Cl.
CPC .................................. *H02G 3/0475* (2013.01)

(58) Field of Classification Search
CPC .... H02G 3/263; H02G 3/0456; H02G 11/006; H02G 3/0437; F16L 3/015
See application file for complete search history.

(56) References Cited

U.S. PATENT DOCUMENTS

| | | | | |
|---|---|---|---|---|
| 3,219,317 A * | 11/1965 | Merker | ............... | B66C 13/12 200/61.42 |
| 3,994,373 A * | 11/1976 | Loos | ............... | F16G 13/16 191/12 C |
| 4,129,277 A * | 12/1978 | Tenniswood | ......... | H02G 11/006 191/12 C |
| 4,462,565 A * | 7/1984 | Johnson | ............... | F16L 3/015 191/12 C |
| 4,600,817 A * | 7/1986 | Hackenberg | ......... | H02G 11/006 191/12 C |
| 5,271,585 A * | 12/1993 | Zetena, Jr. | ........... | G02B 6/4459 174/95 |
| 5,649,415 A * | 7/1997 | Pea | ............... | F16G 13/16 191/12 C |
| 7,119,273 B2 * | 10/2006 | Komiya | ............... | F16G 13/16 174/19 |
| 7,234,292 B1 * | 6/2007 | O'Rourke | ............... | F16G 13/16 248/49 |
| 7,310,935 B2 * | 12/2007 | Worms | ............... | F16G 13/16 248/49 |
| 8,151,956 B2 * | 4/2012 | Wehler | ............... | F16G 13/16 191/12 C |
| 8,575,486 B2 | 11/2013 | Jaeker et al. | | |
| 2011/0061313 A1 * | 3/2011 | Vos | ............... | B66F 9/205 52/118 |
| 2015/0096952 A1 * | 4/2015 | Hall | ............... | E21B 15/00 211/132.1 |
| 2015/0322733 A1 * | 11/2015 | Wells, Sr. | ............... | E21B 19/08 104/89 |

* cited by examiner

*Primary Examiner* — Bradley Duckworth
(74) *Attorney, Agent, or Firm* — Andrew C. Landsman; Godfrey & Kahn, S.C.

(57) ABSTRACT

A long travel cable carrier guide has a plurality of guideposts that support an upper portion of a cable carrier. The plurality of guideposts include horizontal rollers that rotate to allow the cable carrier to pass by the guideposts, but automatically return to a resting position wherein the horizontal rollers protrude into the path of the cable carrier.

2 Claims, 15 Drawing Sheets

CABLE CARRIER GUIDE

FIELD OF THE INVENTION

The present invention relates generally to the field of cable carriers. More particularly, the present invention relates to a guide for a cable carrier where an upper portion of the cable carrier is supported.

BACKGROUND

In the field of cable carriers, especially long travel cable carriers, there is a need to provide support and guidance to the cable carrier to ensure consistent movement of the cable carrier. Cable carriers, also known as drag chains, energy chains, or cable chains, are guides that surround and guide flexible cables and/or hoses that are connected to moving parts of a larger machine. Cable carriers reduce wear and stress on the flexible cables and hoses, prevent entanglement, and improve operator safety by bundling multiple cables together.

Typical cable carriers have a rectangular cross section, inside which the cables travel, and include a plurality of sections that are rotatably attached to each other to form a length of cable carrier. More or less sections may be included in the cable carrier to accommodate cables of any length. Cable carriers come in a wide variety of sizes, depending on the application and number of cables carried by the carrier.

The primary benefit of using a cable carrier is to keep cables organized, separated, and protected in applications where the cable must move relative to the machinery to which it is attached. Some common non-exhaustive examples of where cable carriers are used are automated car washes, elevators, cranes, vending machines, and machine tools. A cable carrier can be used to guide and protect cables in any machine that has a movable part connected to a power source and/or control board.

In applications where the cable carrier travels a long horizontal distance, it may be necessary to support the cable carrier with a cable carrier guide to prevent damage to the cable carrier and to ensure efficient, low friction operation of the cable carrier. In particular, if the cable carrier travels a long horizontal distance and has a lower anchor point and an upper section that moves in relation to the lower anchor point, gravity causes the upper section to droop, and if the distance is long enough the upper section may droop so far that it contacts the lower section. Thus, there is a need for a modular, low friction guide that supports the upper section of the cable guide.

SUMMARY

The present invention relates to a guide for a cable carrier that travels along a path. The cable carrier has an upper portion, a middle portion, and a lower portion. The guide includes a plurality of guideposts positioned on either side of the path, and each of the guideposts has at least one horizontal support roller attached to a rotation head. The rotation head is positioned at the top of a support post and includes a base removably attached to the support post so that the base cannot rotate with respect to the support post. The rotation head has a resting position and an engaged position, wherein the rotation head provides support to the cable carrier when it is in the resting position, and the rotation head allows the cable carrier to pass by the guidepost when in the engaged position.

It will be understood by those skilled in the art that one or more aspects of this invention can meet certain objectives, while one or more other aspects can lead to certain other objectives. Other objects, features, benefits and advantages of the present invention will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

DETAILED DESCRIPTION

Figure 1:
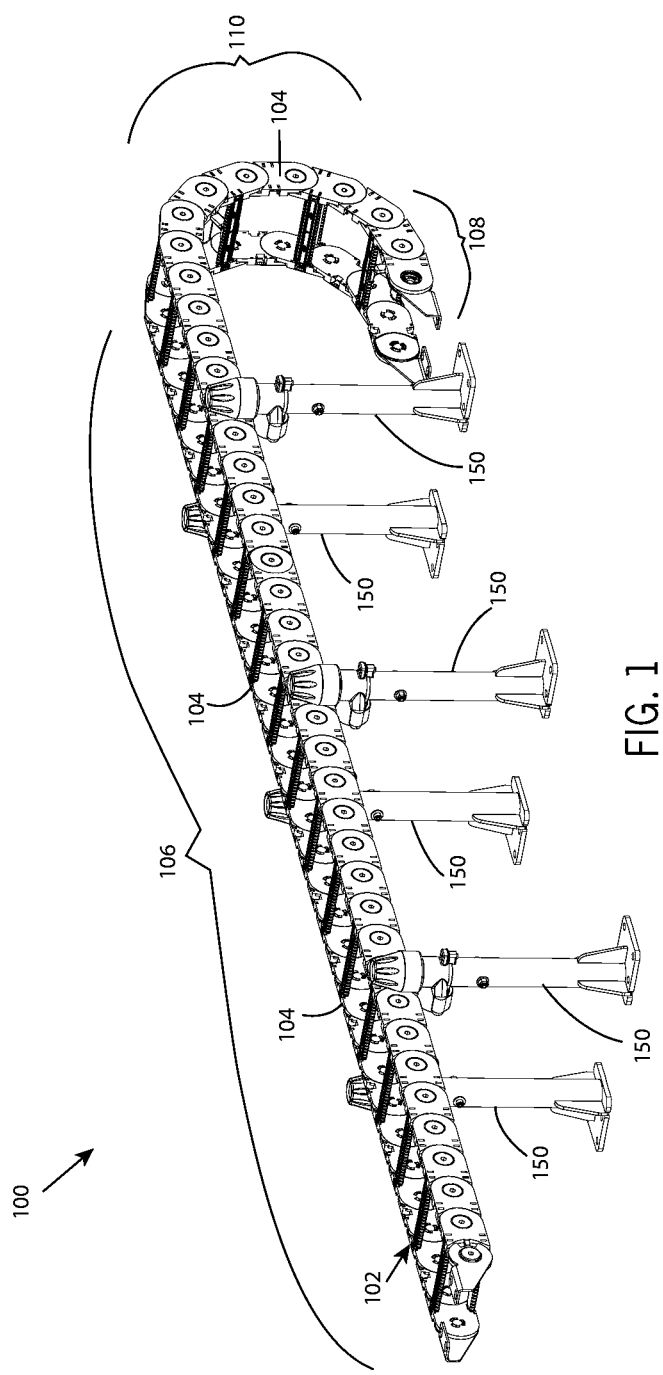
FIG. 1 is a top perspective view of one embodiment of a long travel cable carrier guide in accordance with the invention.
Figure 2:
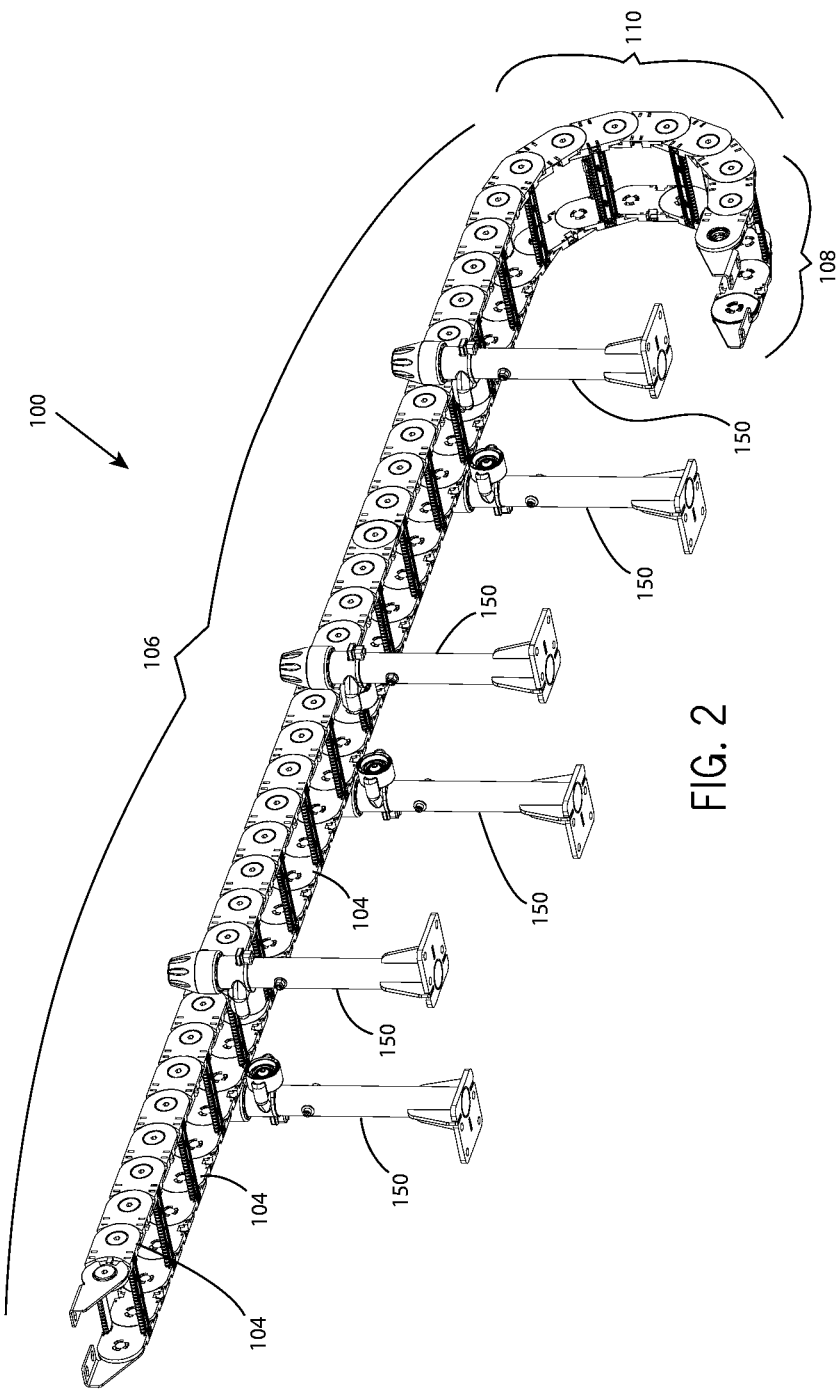
FIG. 2 is a bottom perspective view of the long travel cable carrier guide of FIG. 1.
Figure 3:
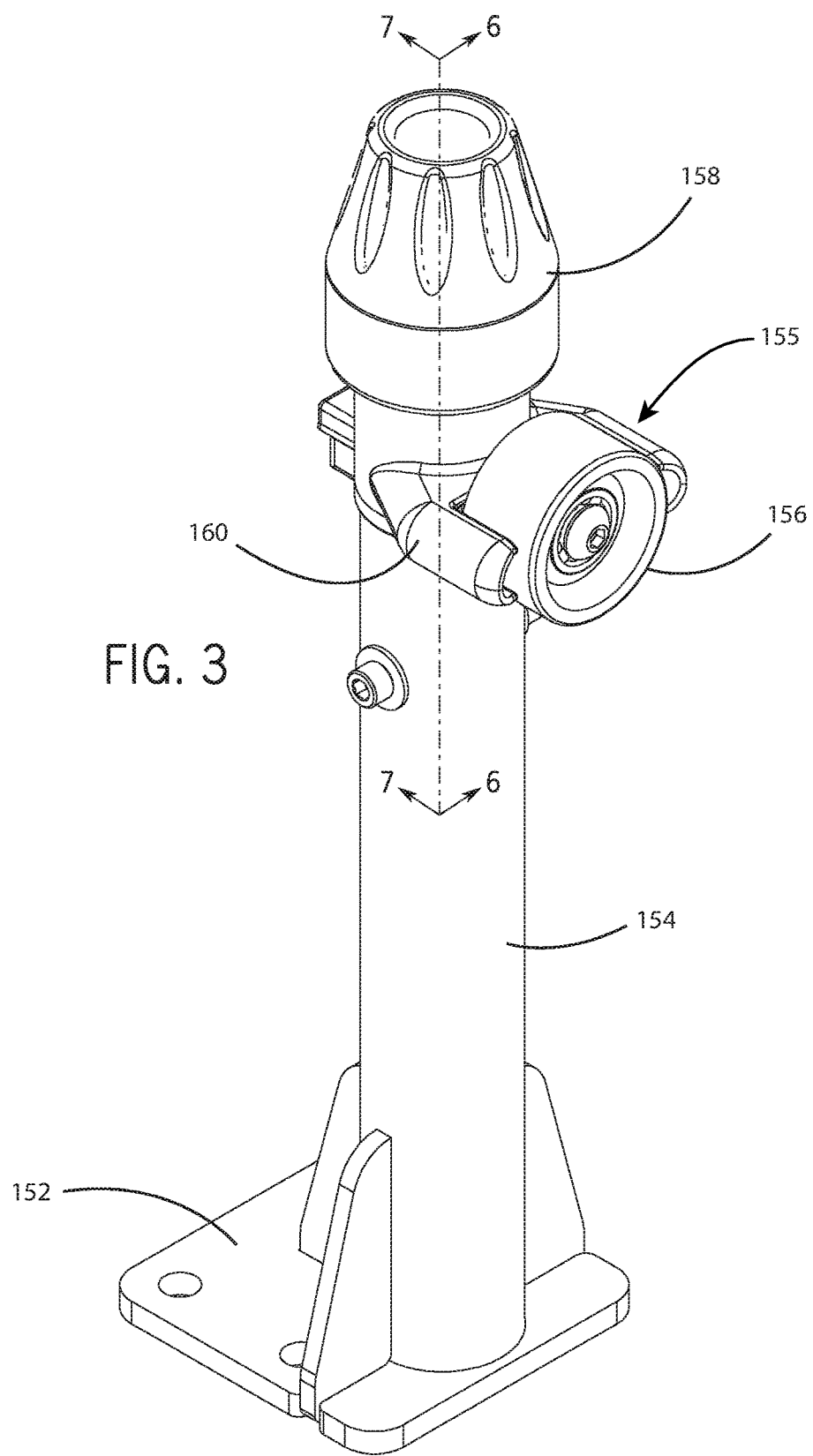
FIG. 3 is a perspective view of one embodiment of a guidepost in accordance with the invention showing a horizontal roller in a resting position.
Figure 4:
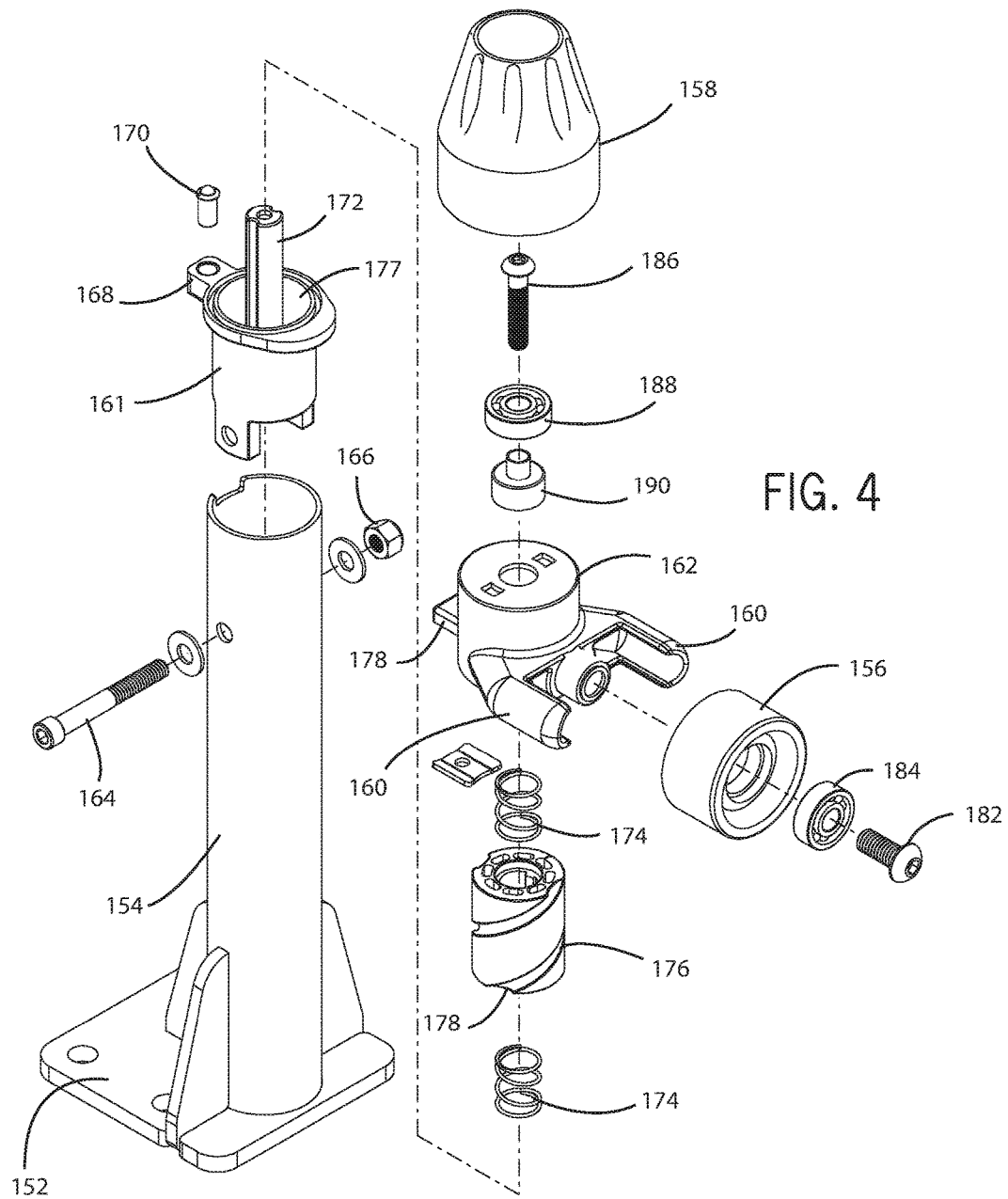
FIG. 4 is an exploded perspective view of the guidepost of FIG. 3.
Figure 5:
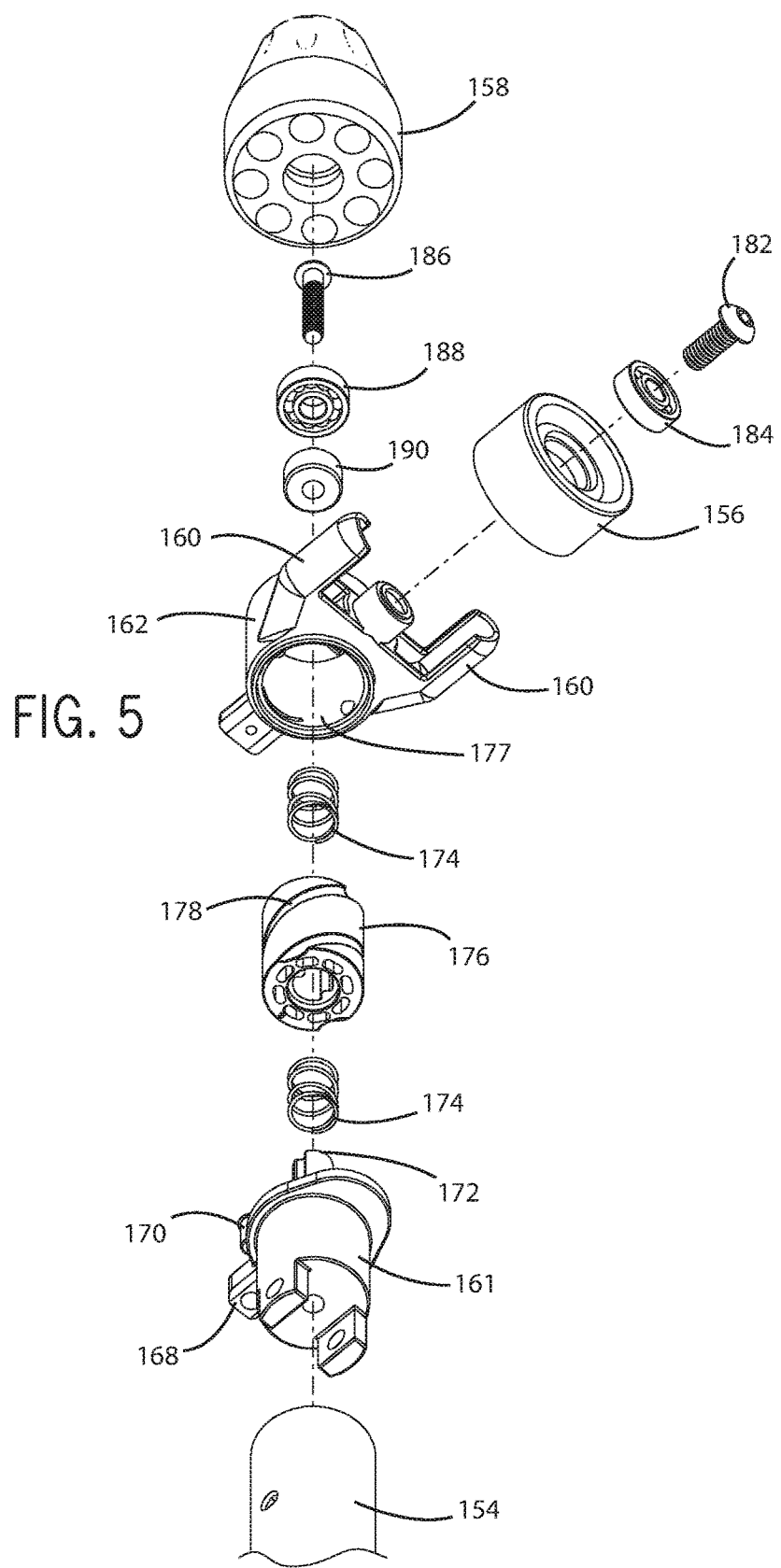
FIG. 5 is a partial exploded perspective view of the guidepost of FIG. 3.
Figure 6:
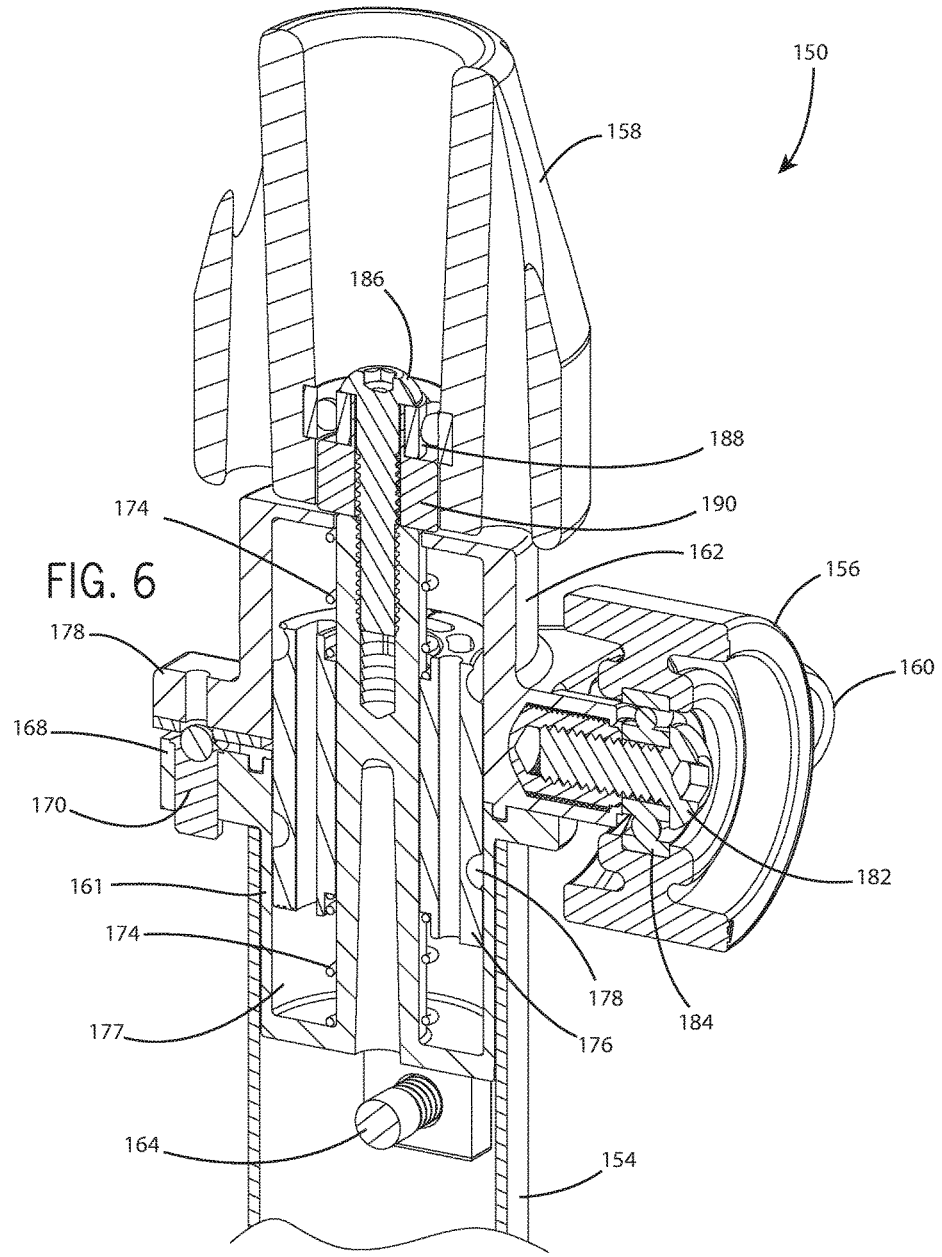
FIG. 6 is a section view of the guidepost of FIG. 3 taken generally along line 6-6 in FIG. 3.

Referring to FIGS. 1-2, one embodiment of a long travel cable carrier guide 100 in accordance with the invention is shown. The long travel cable carrier guide 100 includes a plurality of guideposts 150 that are positioned along a length of travel of a cable carrier 102. Cable carrier 102 includes a plurality of sections 104 that are rotatably and removably attached to each other to create a chain that can articulate. The long travel cable carrier guide 100 has an upper portion 106 and a lower portion 108. The lower portion 108 is anchored to a base such as a floor. The upper portion 106 is attached to a movable part.

The upper portion 106 and lower portion 108 are connected to each other by a curved middle portion 110. The curved middle portion 110 has a consistent geometry based on the configuration of the sections 104 that only allow the curved middle portion to have a curvature that does not overbend the cables. In the embodiment shown, as the cable carrier 102 travels along a horizontal path, the cable carrier has more or less of an upper portion, and more or less of a lower portion, depending on the position of the cable carrier.

As shown, the guideposts 150 are positioned in pairs along the length of the path of travel of the cable carrier 102. Alternatively, the guideposts 150 may be positioned in any suitable arrangement without departing from the invention, e.g., offset in position.

Turning now to FIGS. 3-10, one embodiment of a guidepost 150 in accordance with the invention is shown. The guidepost 150 includes a base 152, a support post 154, and a roller assembly 155. The roller assembly 155 includes a horizontal roller 156, and a vertical roller 158. The horizontal roller 156 supports the upper portion 106, and the vertical roller 158 guides the upper portion to maintain its position over the lower portion 108. The horizontal roller 156 is protected by a bumper 160 that the curved middle portion 110 contacts as the cable carrier 102 passes by the guidepost 150.

The roller assembly includes a swivel base 161 and a rotation head 162. The horizontal roller 156 and vertical roller 158 are rotatably attached to the rotation head 162. The rotation head 162 may rotate either clock-wise or counter-clockwise depending on whether the cable carrier 102 is extending or retracting past the guidepost 150.

As shown, the swivel base 161 is inserted into the support post 154 and secured in position by a bolt 164 that passes through the support post and the swivel base and is secured by a nut 166. In the embodiment shown, the swivel base 161 includes a tab 168 into which a spring loaded ball plunger 170 is inserted, and a spindle 172 onto which the rotation head 162 is mounted.

Figure 7:
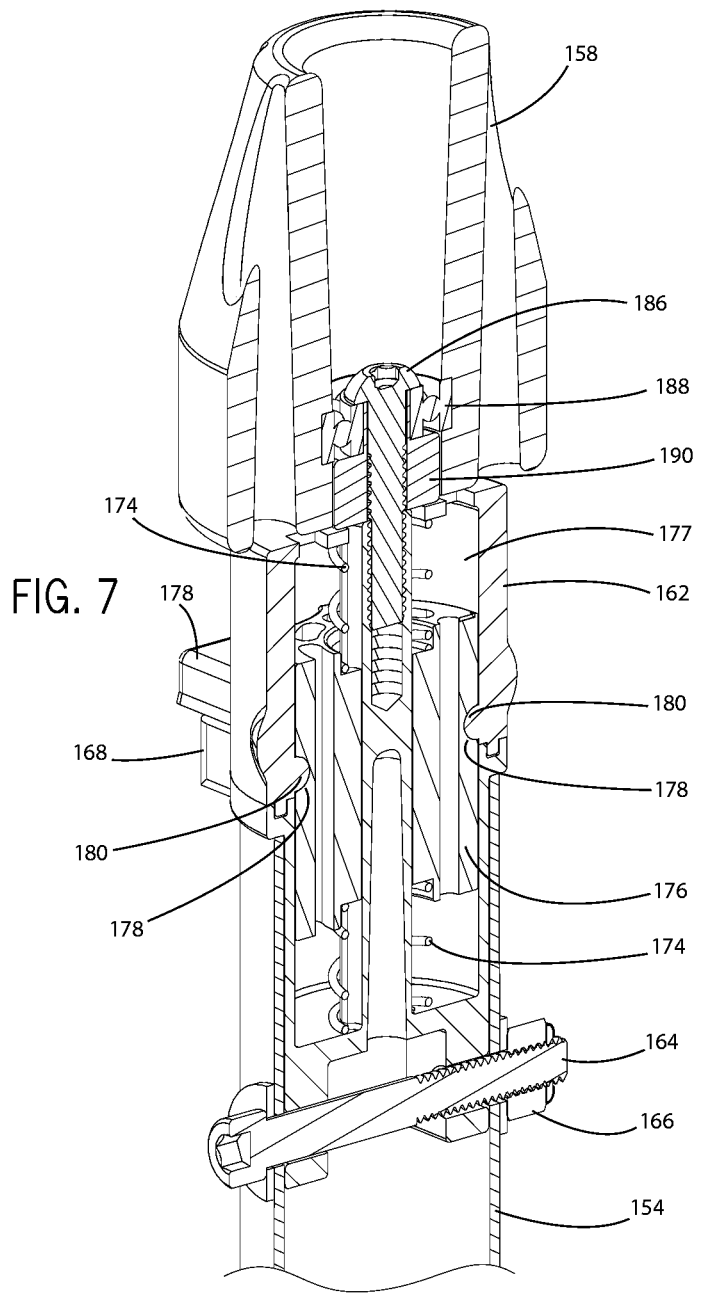
FIG. 7 is another section view of the guidepost of FIG. 3 taken generally along line 7-7 in FIG. 3.
Figure 8:
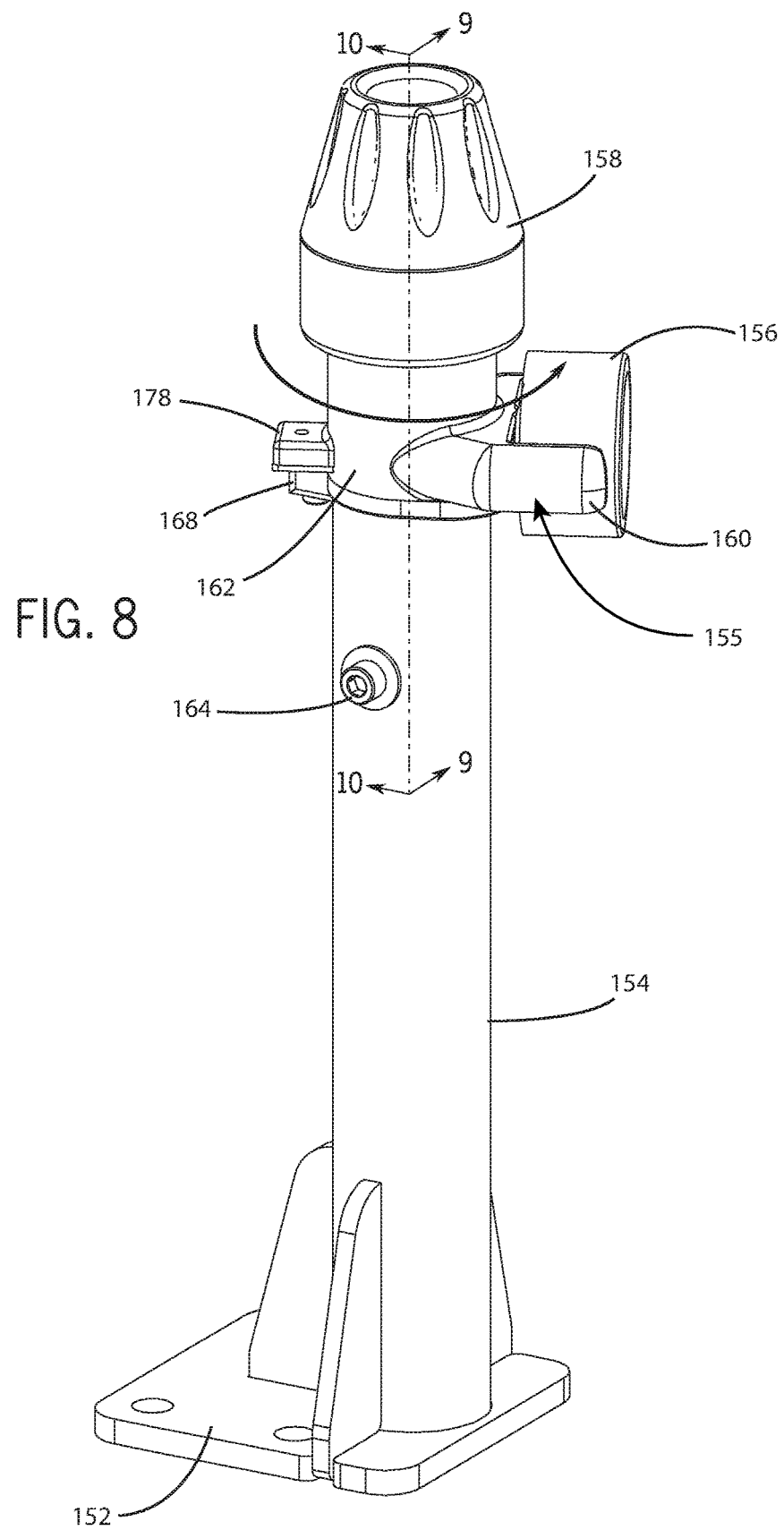
FIG. 8 is another perspective view of the guidepost of FIG. 3 showing the horizontal roller in an engaged position.
Figure 9:
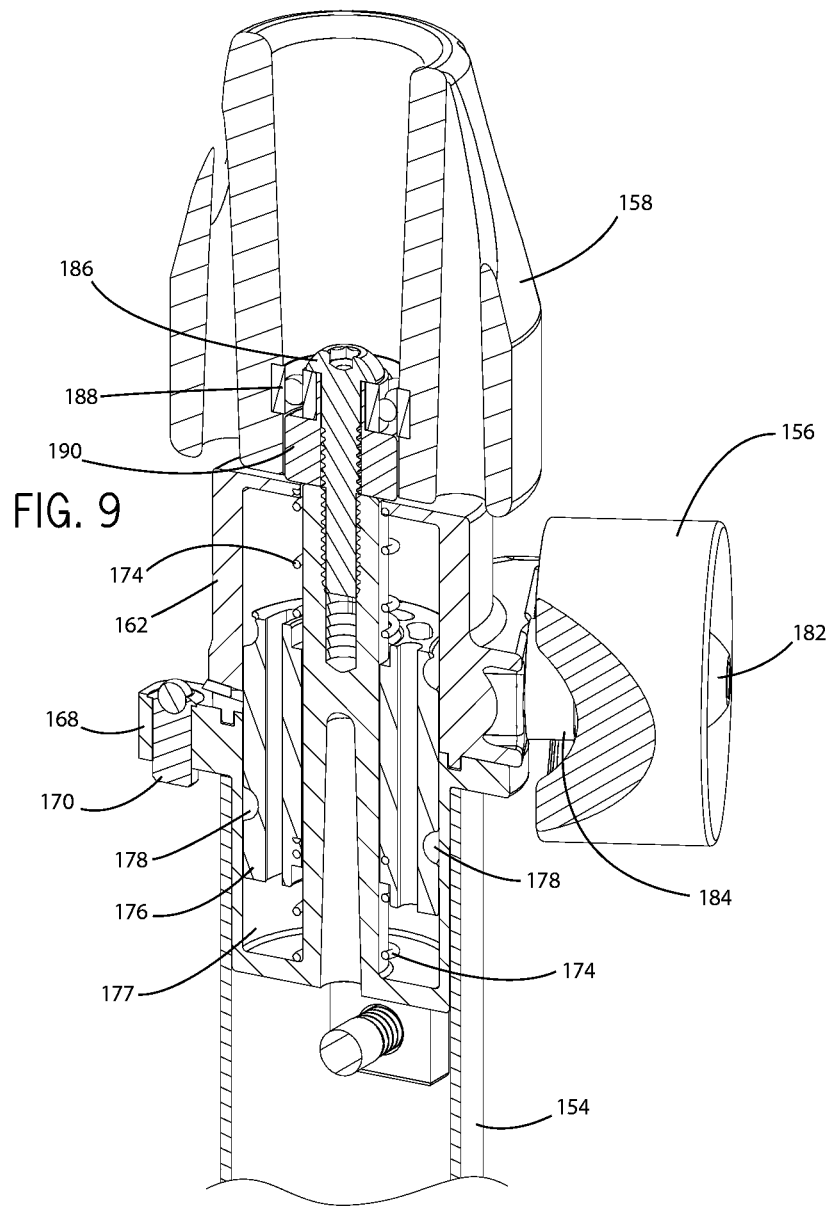
FIG. 9 is a section view of the guidepost of FIG. 3 taken generally along line 8-8 in FIG. 8.
Figure 10:
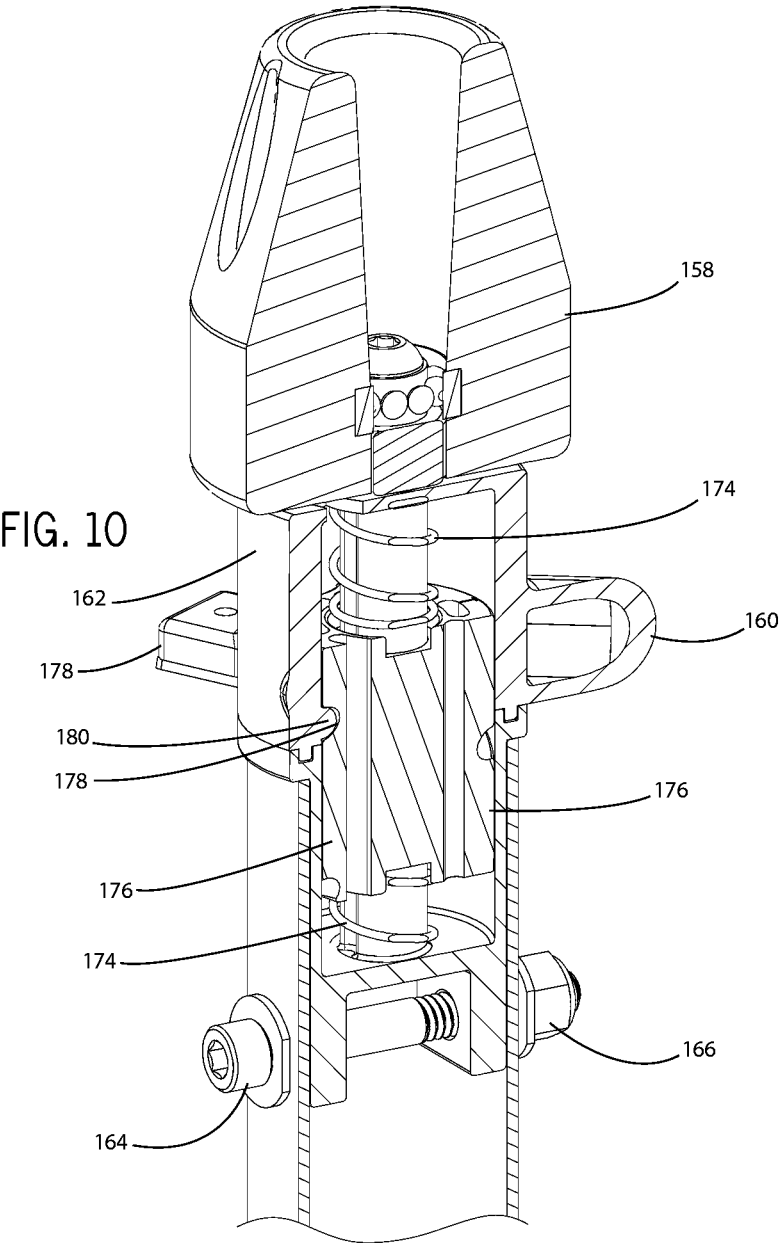
FIG. 10 is another section view of the guidepost of FIG. 3 taken generally along line 10-10 in FIG. 8.
Figure 11:
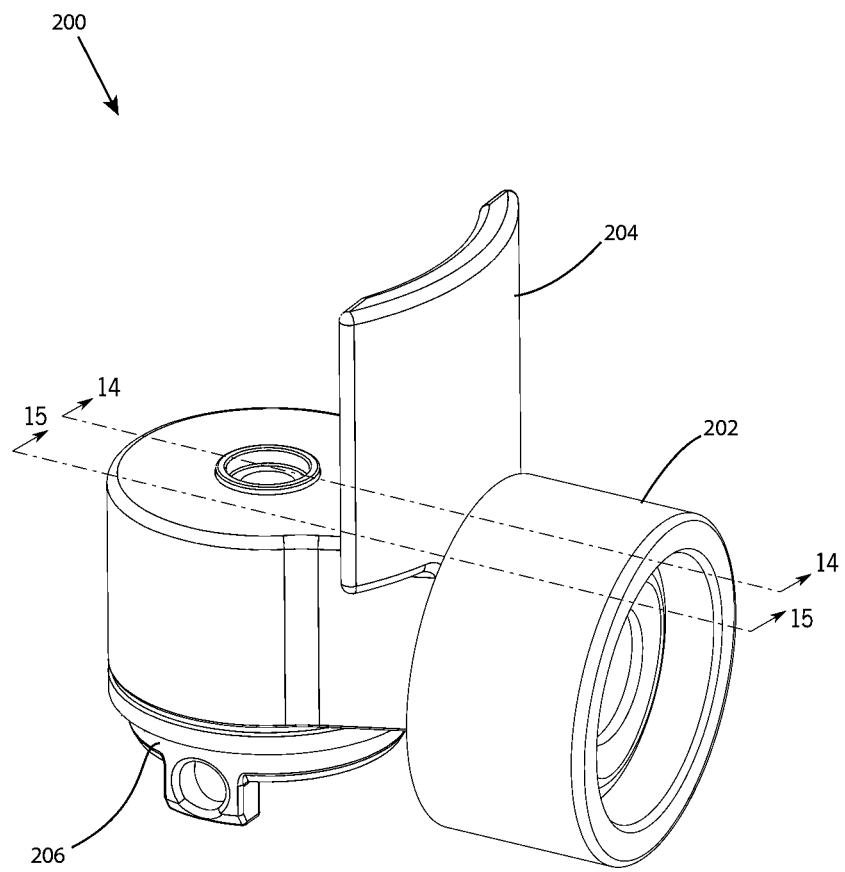
FIG. 11 is a perspective view of one embodiment of a support roller in accordance with the invention.
Figure 12:
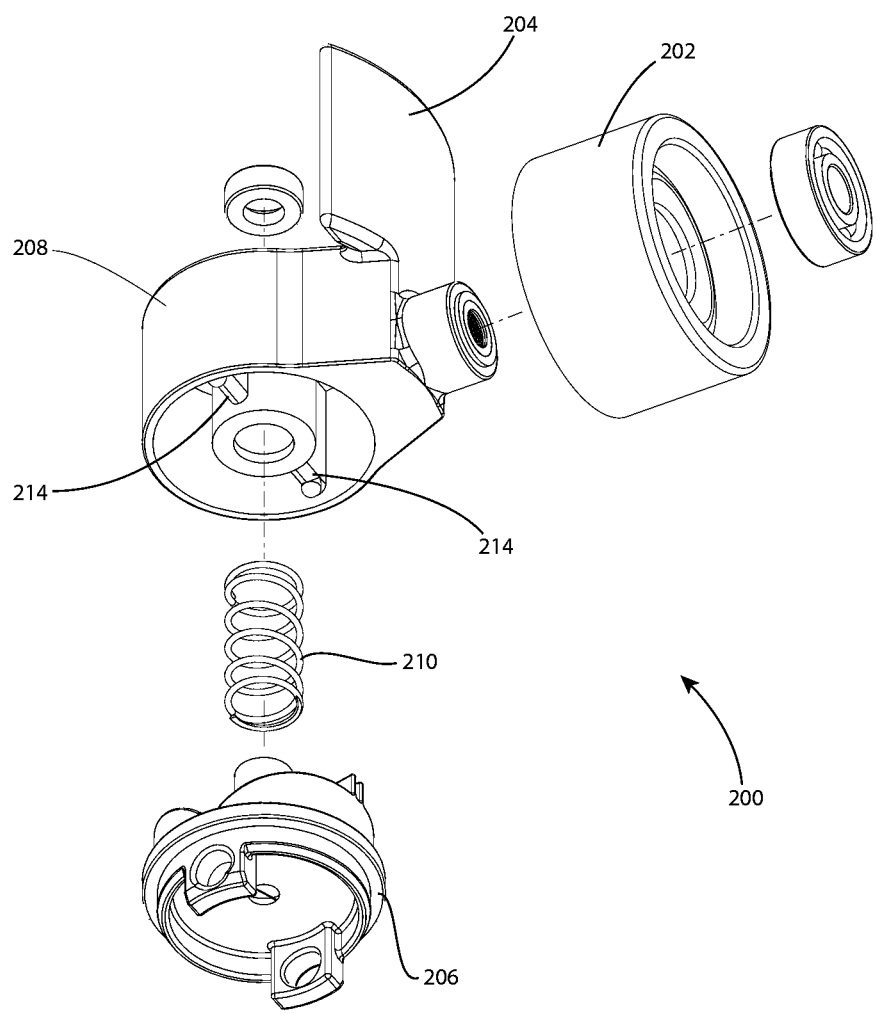
FIG. 12 is an exploded view of the support roller of FIG. 11.
Figure 13:
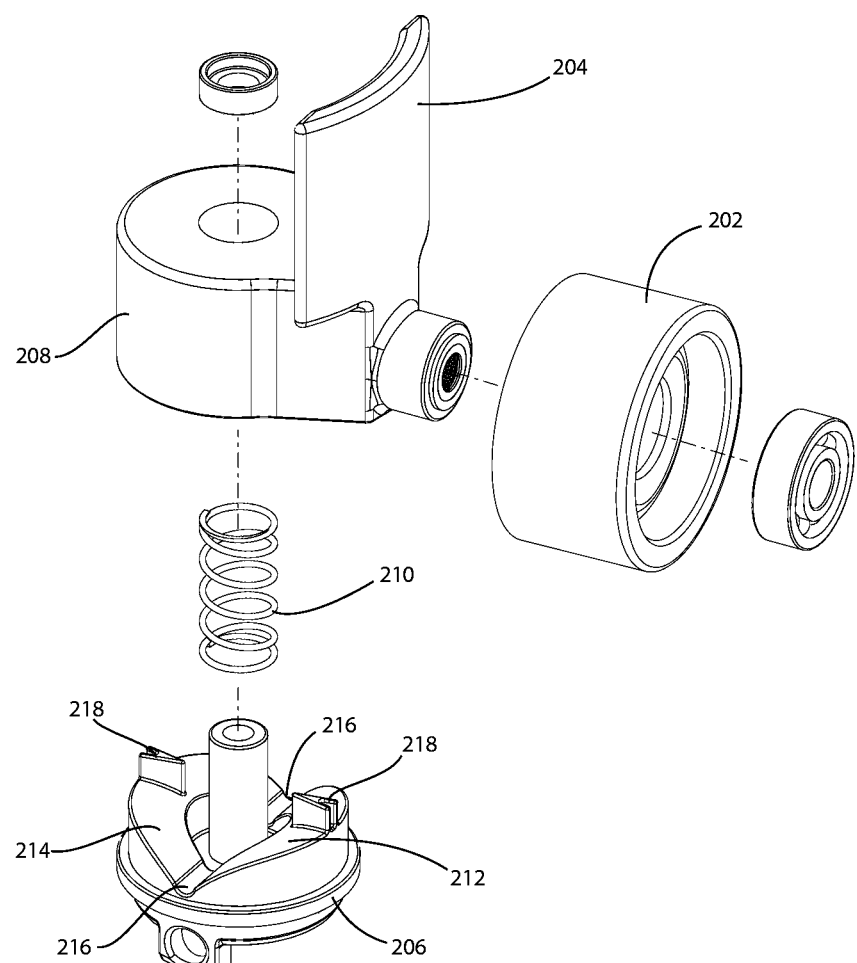
FIG. 13 is another exploded view of the support roller of FIG. 11.
Figure 14:
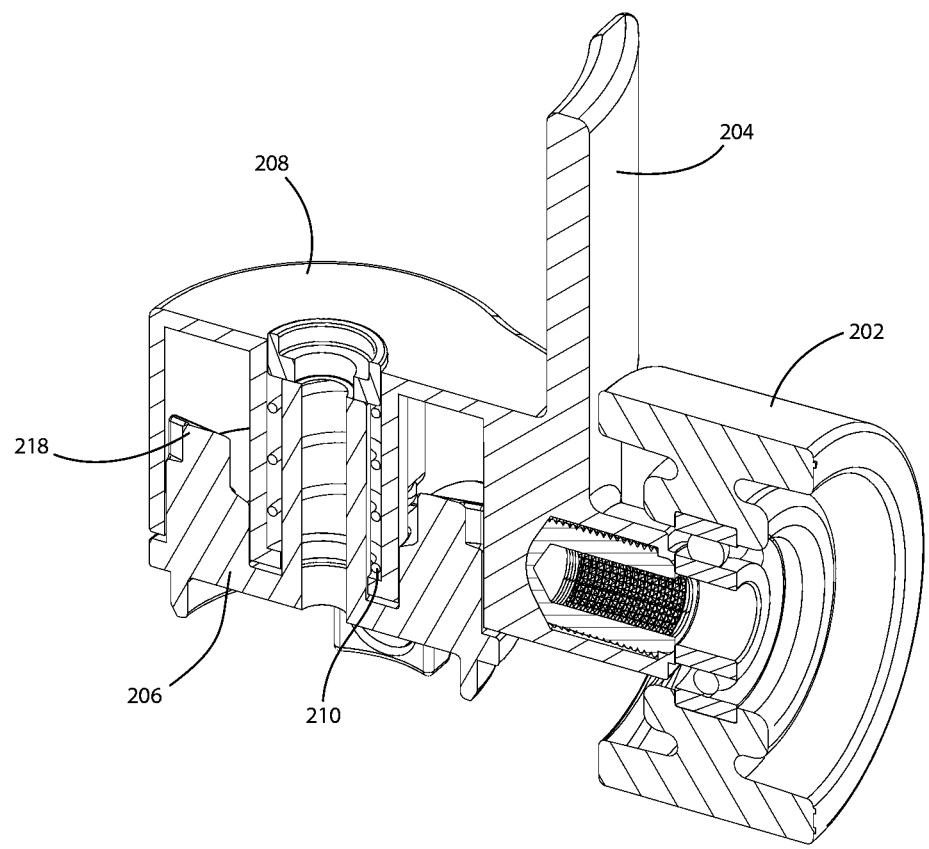
FIG. 14 is a section view of the support roller of FIG. 11 taken generally along line 14-14 in FIG. 11.
Figure 15:
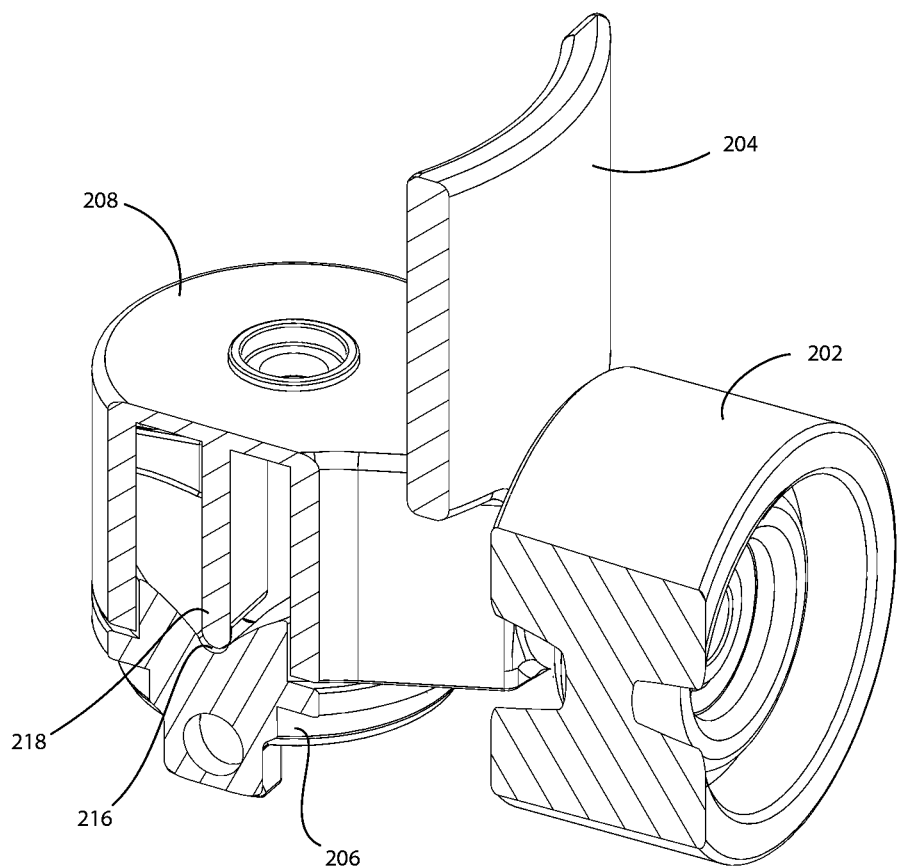
FIG. 15 is another section view of the support roller of FIG. 11 taken generally along line 15-15 in FIG. 11.

In the embodiment shown, two springs 174 are inserted over the spindle 172 and are disposed between a screw cylinder 176. As shown in FIG. 7, the screw cylinder 176 is disposed between the springs 174 and includes a spiral recess 178 that engages a protrusion 180 at the base of the rotation head 162. As the rotation head turns, the engagement of the protrusion 180 and the spiral recess 178 causes the screw cylinder to raise or lower. The springs 174 tend to bias the screw cylinder 176 to a resting position where the screw cylinder is centered between the springs and the horizontal roller extends into the path of the cable carrier 102. A tab 178 on the rotation head 162 also engages the ball plunger 170 when the rotation head is in the resting position. As shown in FIGS. 8-10, the screw cylinder 176 travels within a cavity 177 that prevents the rotation head 162 from spinning freely. Rather, the screw cylinder 176 moves vertically due to rotation of the rotation head 162, and when the screw cylinder reaches the top or bottom of the cavity 177, it stops the rotation of the rotation head. This ensures that the rotation head 162 does not rotate completely out of the path of the cable carrier 102. Of course, any alternate means of biasing the rotation head 162 in the resting position may be used without departing from the invention.

Horizontal roller 156 is attached to the rotation head 162 by a screw 182 that captures a lower ball bearing 184 between the horizontal roller and the rotation head and allows the horizontal roller to rotate freely. Likewise, vertical roller 158 is attached to the rotation head 162 by a screw 186 that captures an upper ball bearing 188 and allows the vertical roller to rotate freely. In the embodiment shown, a spacer 190 is also included between the rotation head 162 and the upper ball bearing 188.

Turning now to FIGS. 11-15, another embodiment of a rotation head 200 in accordance with the invention is shown. The rotation head 200 only includes a horizontal roller 202, and omits the vertical roller of the previously described embodiment. In place of the vertical roller, a vertical tab 204 extends near the base of the horizontal roller 202. Vertical tab 204 has a convex profile that minimizes the friction generated between the cable carrier 102 and the vertical tab when there is contact between the two.

Rotation head 200 includes a base 206 that is secured to support post 154 in the same manner as the previously described embodiment, i.e., with a screw and nut that pass through the base and the support post that prevents rotation of the base relative the support post. A top cover 208 that includes the vertical tab 204 is rotatably attached to the base 206. A torsion spring 210 is captured between the top cover 208 and the base 206 and biases the top cover in a resting position where the horizontal roller 202 is disposed in the path of the cable carrier 102. To further bias the rotation head 200 in the resting position, the base 206 includes sloped surfaces 212 on which tabs 214 in the top cover ride when the rotation head is rotated. The sloped surfaces 212 meet in a valley 216. Due to gravity, the tabs 214 tend to travel toward the valley 216, which is oriented so that when the tabs align with the valley, the rotation head 200 is in the resting position. When the rotation head 200 is rotated 90 degrees, the tabs 214 contact stops 218 that prevent the rotation head from rotating more than 90 degrees.

When the cable carrier passes by the rotation head 200, it contacts the horizontal roller 200, causing it to rotate out of its path. When the cable carrier 102 has passed the horizontal roller 200, it springs back to the resting position so that the cable carrier horizontal roller is supported by and rides on top of the horizontal roller.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. A guide for a cable carrier that travels along a path, the cable carrier having an upper portion, a middle portion, and a lower portion, the guide comprising:
    a plurality of guideposts positioned on either side of the path;
    each of the plurality of guideposts having a roller assembly including at least one horizontal support roller attached to a rotation head;
    the roller assembly including a base attached to a support post so that the base cannot rotate with respect to the support post; and
    the rotation head is rotatably attached to the base and having a resting position and an engaged position, wherein the horizontal support roller provides support to the cable carrier when the rotation head is in the resting position, and the cable carrier may pass by the guidepost when the rotation head is in the engaged position;
    the roller assembly further including a screw portion within a cavity;
    the screw portion disposed between two springs within the cavity; and
    the screw portion including a recess engaged with a protrusion on the rotation head that raises or lowers the screw portion when the rotation head rotates.

2. The guide of claim 1, wherein the screw portion is biased to the center of the cavity.

* * * * *